United States Patent
Elliott et al.

(10) Patent No.: US 7,344,078 B2
(45) Date of Patent: Mar. 18, 2008

(54) DEVICE FOR SCANNING AND PRINTING BARCODES

(75) Inventors: Ame Elliott, San Francisco, CA (US); Gregory J. Wolff, Redwood City, CA (US); John W. Barrus, Menlo Park, CA (US)

(73) Assignee: Riocoh Co., Ltd., Tokyo (JP)

( * ) Notice: Subject to any disclaimer, the term of this patent is extended or adjusted under 35 U.S.C. 154(b) by 0 days.

(21) Appl. No.: 10/314,014

(22) Filed: Dec. 5, 2002

(65) Prior Publication Data

US 2004/0108381 A1 Jun. 10, 2004

(51) Int. Cl.
*G06K 7/10* (2006.01)

(52) U.S. Cl. .......................... 235/462.01; 235/462.45; 235/462.47; 235/462.48; 235/472.01

(58) Field of Classification Search .......... 235/462.01, 235/462.08, 462.46, 462.47, 472.01–472.03, 235/462.45, 462.48
See application file for complete search history.

(56) References Cited

U.S. PATENT DOCUMENTS

| 4,746,932 | A | * | 5/1988 | Sato ........................... 347/171 |
| 4,978,305 | A | * | 12/1990 | Kraft ........................... 434/353 |
| 5,227,617 | A | * | 7/1993 | Christopher et al. ... 235/462.13 |
| 5,382,779 | A | * | 1/1995 | Gupta ......................... 235/383 |
| 5,431,288 | A | * | 7/1995 | Nishijima et al. .......... 209/584 |
| 5,531,530 | A | * | 7/1996 | Kuramoto et al. .......... 400/593 |
| 5,602,377 | A | * | 2/1997 | Beller et al. ........... 235/462.15 |
| 5,801,844 | A | | 9/1998 | Yamakawa et al. |
| 6,068,366 | A | * | 5/2000 | Bolash et al. .................. 347/43 |
| 6,088,182 | A | * | 7/2000 | Taki et al. ..................... 360/71 |
| 6,170,746 | B1 | * | 1/2001 | Brook et al. ................. 235/385 |
| 6,512,919 | B2 | * | 1/2003 | Ogasawara ............... 455/422.1 |
| 6,540,143 | B1 | * | 4/2003 | Matsumori ............. 235/462.13 |
| 6,670,885 | B2 | * | 12/2003 | Kosaka ........................ 340/3.1 |

* cited by examiner

*Primary Examiner*—Steven S. Paik
(74) *Attorney, Agent, or Firm*—Blakely, Sokoloff, Taylor & Zafman LLP

(57) ABSTRACT

A method and apparatus for scanning and/or printing barcodes is described. In one embodiment, the method includes scanning a barcode at a first location with a device, storing the scanned barcode in a memory in the device, and printing the barcode at a second location with the device, where the second location and first location are not the same.

24 Claims, 5 Drawing Sheets

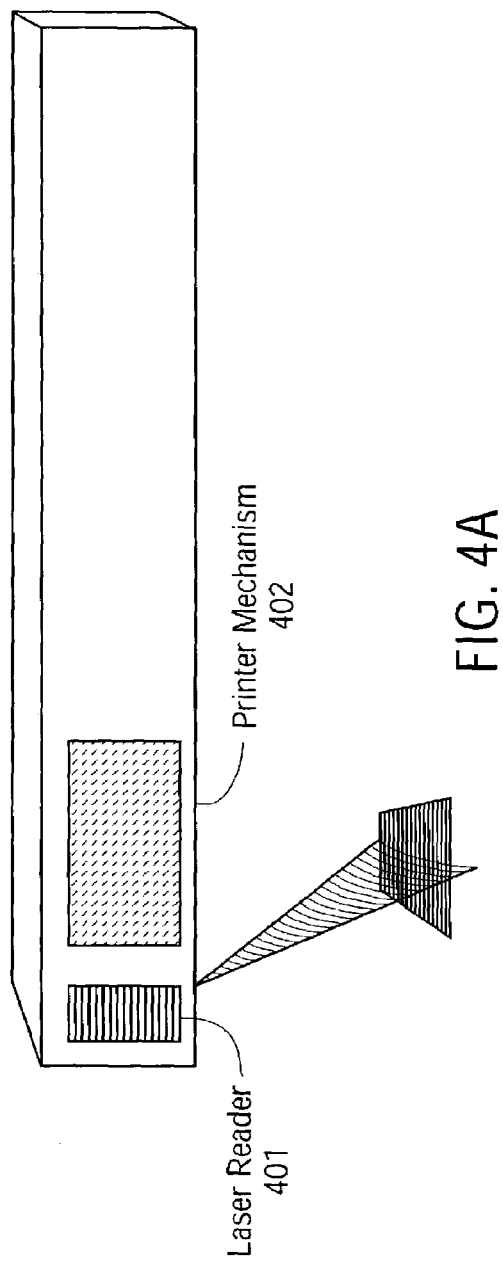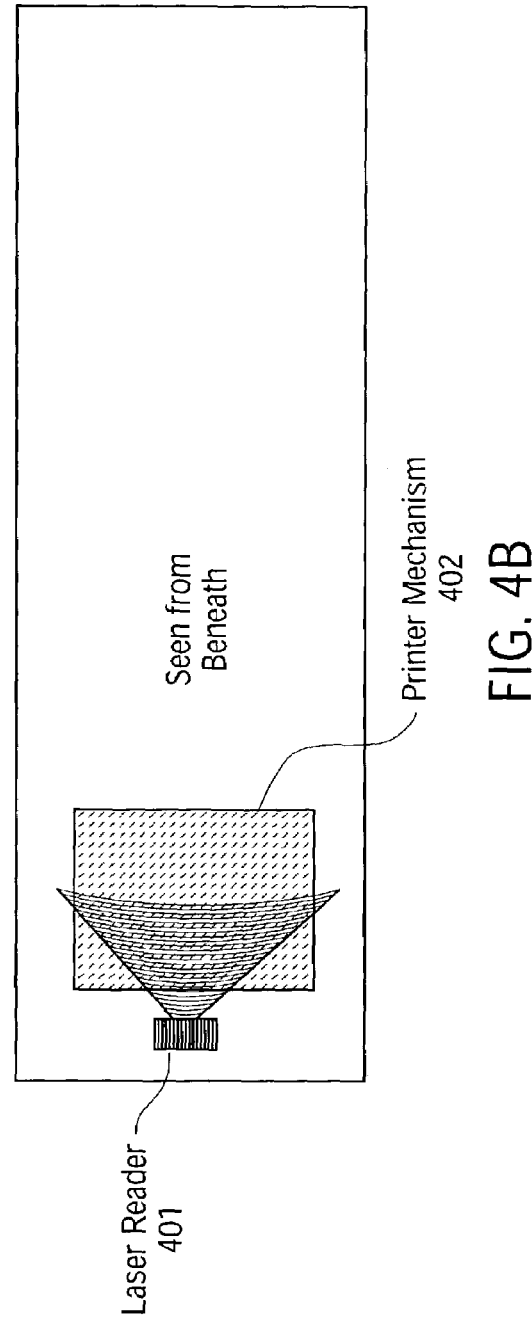

DEVICE FOR SCANNING AND PRINTING BARCODES

FIELD OF THE INVENTION

The present invention relates to the field of barcodes; more particularly, the present invention relates to scanning and printing barcodes with the same device.

BACKGROUND OF THE INVENTION

Barcodes have been used for many years in commercial settings. Barcodes are printed on many media and represent information in encoded form. Once printed, these barcodes may be scanned using a barcode scanner, which reads the barcode to decode the information encoded therein. The prior art includes many examples of printing machines capable of printing barcodes and many instances of barcode scanners. Furthermore, there are many handheld technologies for scanning and printing barcodes. However, these technologies rely on a particular media, such as stickers or thermal paper.

Barcodes are often used in hospital and doctor's offices to keep track of patient information. These barcodes are created using a computer with a printer. Currently, barcoded stickers are applied by hand to a patient's folders, to every page of identical forms (white copy, pink copy, yellow copy), and to other media such as armbands and lab samples. While preparing a patient's files, technicians may discover a need for more barcodes, for example because additional copies of lab reports were requested. In order to create more barcodes, a user uses an application running on a personal computer. To enter a patient name or ID, an image of the barcode corresponding to that ID is created and that barcode image is sent to a printer. The barcode stickers must then be picked up at the printer. The computers and printers are generally consolidated in a centralized location (e.g., behind a registration desk). However, barcodes may be needed to be placed on objects throughout the hospital in locations far from the computers and printers, such as on charts hanging from doors in hallways, on carts to carry reports to other parts of the hospital, in an examination room, in a lab, etc. Thus, it is very inconvenient to have to go to the computer and printer to create additional barcodes when the additional barcode is needed in a location far away from the printer.

SUMMARY OF THE INVENTION

A method and apparatus for scanning and/or printing barcodes is described. In one embodiment, the method includes scanning a barcode at a first location with a device, storing the scanned barcode in a memory in the device, and printing the barcode at a second location with the device, where the second location and first location are not the same.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A and 4B illustrates the relationship of a barcode reader and printer mechanism.

DETAILED DESCRIPTION OF THE PRESENT INVENTION

Figure 1:
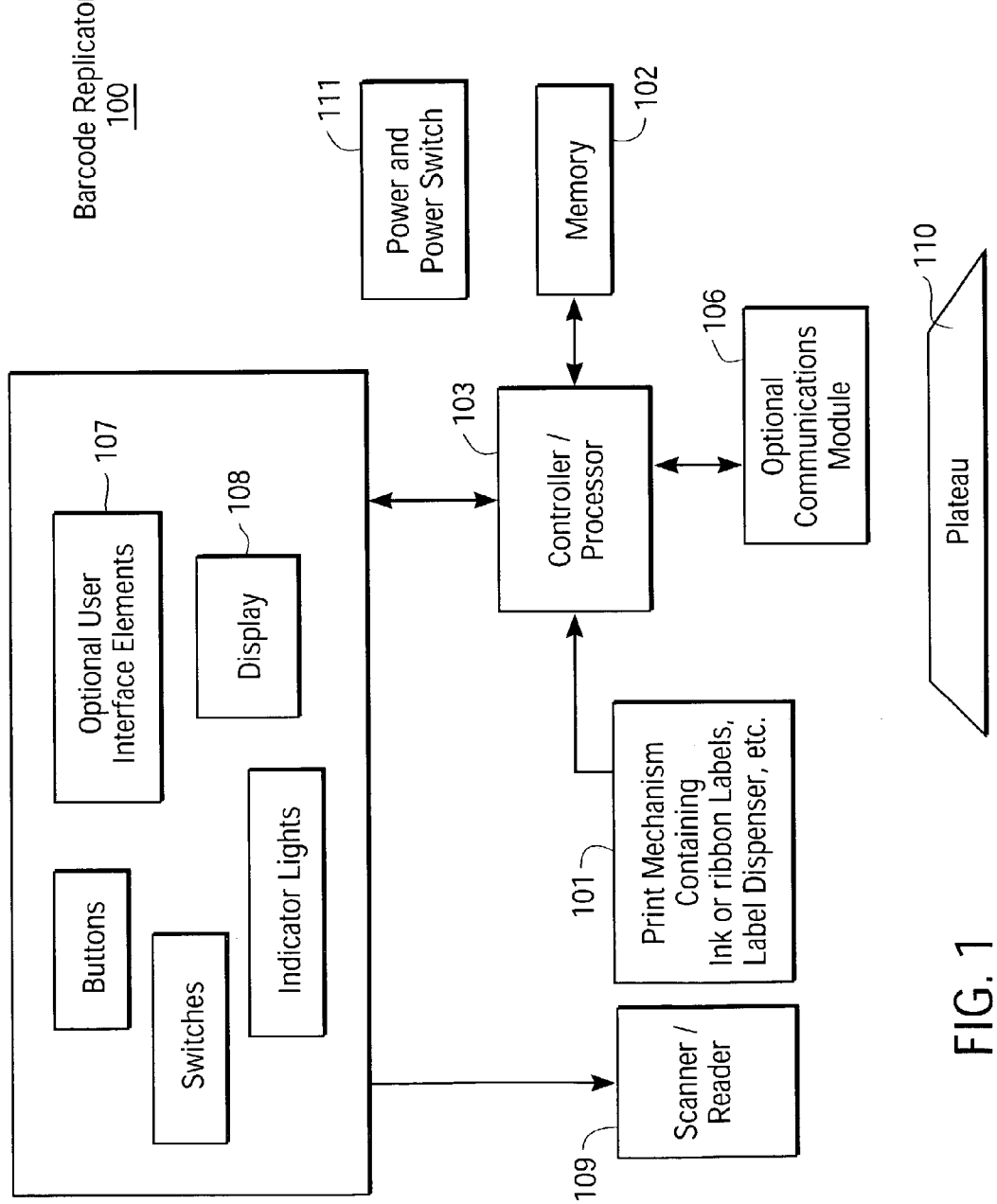
FIG. 1 is a block diagram of one embodiment of a barcode replicator.

A barcode replicator is described. In one embodiment, the barcode replicator is a hand-held device for reading barcodes, storing barcodes, and printing the barcode on any media (e.g., paper, non-paper, cardboard, film, plastic, etc.). The barcode replicator reproduces barcodes by scanning a barcode and then printing the same barcode on other surfaces.

After the barcode replicator scans a barcode, the barcode replicator is ready to replicate the barcode. Thus, the barcode replicator is a device that allows people working with a barcode away from a computer to produce copies of barcodes where they need them without relying on any special media. In one embodiment, the barcode replicator also validates the newly printed barcodes and re-applies the barcode on a sticker attached to the media if the original print is unreadable.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram of one embodiment of a device that reads barcodes, stores barcodes, and prints barcodes on some form of print media. The device may be sized for hand-held use or larger use (portable or not). Referring to FIG. 1, barcode replicator 100 includes a printing mechanism (printer) 101 that prints barcodes. In one embodiment, the printer head comprises Ink Jet Technology SP75 from Ink Jet Technology, Inc. of San Jose, Calif.

Barcode replicator 100 includes a scanner/barcode reader 109. In one embodiment, scanner/barcode reader 109 operates based on a CCD (which takes an image of a barcode) or a scanning light, like a laser, that scans over the barcode and whose reflections are read by a sensor. In one embodiment, the barcode reader/scanner comprises a CCD optical module from Champ of Westbury, N.Y. or a SP70 laser engine. These are non-contact scanners, like those found in retail sales establishments. Alternatively, the barcode reader portion of printer/scanner 101 maybe a contact scanner like a barcode pen.

FIGS. 4A and 4B illustrates the relationship of a barcode reader and printer mechanism. Referring to FIGS. 4A and 4B, a laser reader 401 is shown as well as the printing mechanism 402. Reader 401 and printer mechanism 402 may correspond to reader/scanner 109 and print mechanism 104, respectively. Reader/Scanner 401 and printer mechanism 402 do not overlap because reader 401 can focus its scanning head light beneath the printhead of printer mechanism 402. Alternatively, reader 401 can read a page of the pages is being inserted or is being removed. This is shown more clearly in FIG. 5.

Figure 5:
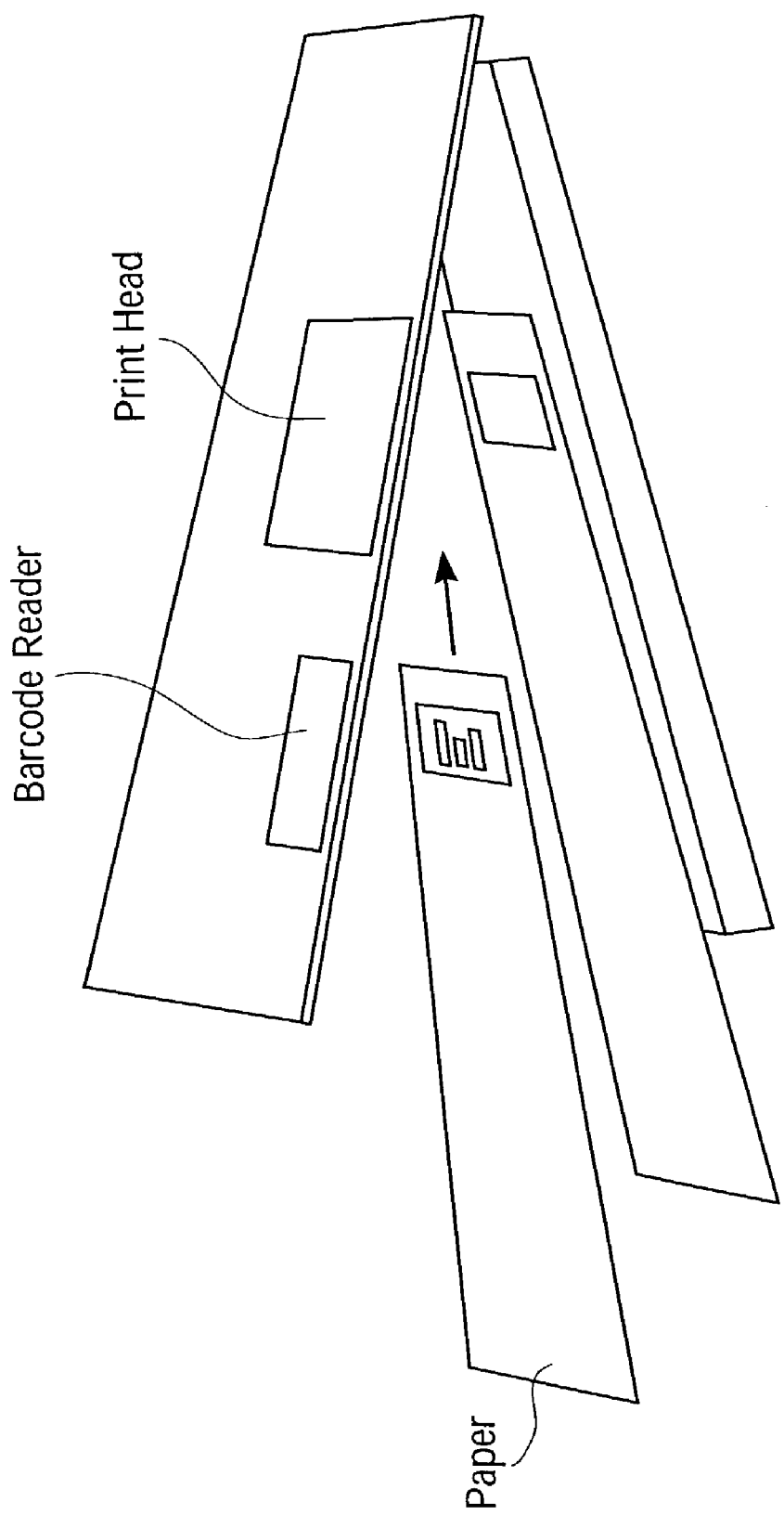
FIG. 5 illustrates a barcode replicator with a "stapler" form factor.

FIG. 5 illustrates a barcode replicator with a "stapler" form factor. As the paper (or other media) is inserted into barcode replicator, a barcode on the paper may be read. Similarly, as a piece of paper is being removed from the barcode replicator, any barcode that is printed by the printhead on the paper may be read and/or verified. Note that, in one embodiment, reading is accomplished only by putting the paper into the barcode replicator part way, and that printing occurs when the paper is inserted all the way into the barcode replicator. This can help avoid over printing errors if the original barcode is hard to read.

A memory 102 is coupled to printer/scanner 101 to store barcodes that have been scanned in or to store barcodes that are to be printed. A controller 103 is coupled to printer/scanner 101 and memory 102 to control operation of the device. Controller 103 may comprise one or more processors such as, for example, but not limited to, a StrongArm or an x86 processor from Intel Corporation of Santa Clara, Calif., a DragonBall processor from Motorola of Schaumburg, Ill., etc.

In one embodiment, barcode replicator 100 includes a "read" switch that causes the barcode reader/scanner 109 to read a barcode when activated.

Barcode replicator 100 may also include, as part of printing mechanism 104, an ink depository to store ink for the printer and a sticker dispenser to apply a sticker (in one embodiment with a barcode printed thereon) to a user selected location.

In alternative embodiment, barcode replicator 100 includes a "print" switch which, when used, causes the printhead of printer 104 to print the current barcode that it has stored. This would occur without trying to read a barcode from the media.

In one embodiment, barcode replicator 100 operates as follows. When the barcode replicator comes in contact with a page, it checks for a readable barcode. If one is not detected, barcode replicator 100 prints one. In one embodiment, print head 101 applies the barcode by responding to pressure above a certain threshold, similar to a stapler. Thereafter, barcode replicator 100 checks the success of the print function by trying to read the barcode. This check may be performed by scanning the newly printed barcode. If the barcode is not readable, because for example the media is too porous and the ink has spread after printing, barcode replicator 100 prints a barcode on a sticker and then applies the sticker printed with the barcode to the location of the unreadable barcode.

In one embodiment, barcode replicator 100 resembles a stapler with two parts that can go on either side of a page. The head for reading and printing the barcode goes on top of the page while a platen 110 goes under the page to provide a hard level surface for printing. Barcode replicator 100 can also be unhinged to work without using the arm for resistance, in which case the print head is activated by pressure on the back of the head. When unhinged, printer head could use any flat surface as a platen, even if oriented vertically or upside down.

Barcode replicator 100 may optionally include communications module 106 coupled and controlled by controller 103 to communicate with an external device. Communications module 106 may comprise network, telephone, wired, wireless or other well-known communication applications. Such an external device may be a computer system and/or database. Such a connection may be useful to obtain information (e.g., related to a scanned barcode) or to convey information.

Barcode replicator 100 may optionally include a display 108 (e.g., an LCD display such as used in cell phones and Personal Digital Assistants (PDAs)) to display scanned barcodes and/or other information. The other information may include information obtained from memory 102 or an external location via optional communications module 106.

For example, the information may comprise an individual's name who is associated with the barcode and the information may be obtained from a database stored locally or remotely from barcode replicator 100. User interface 107 may include buttons, switches, indicator lights, and other optional user interface clients.

An Exemplary Barcode Replication Process

Figure 2:
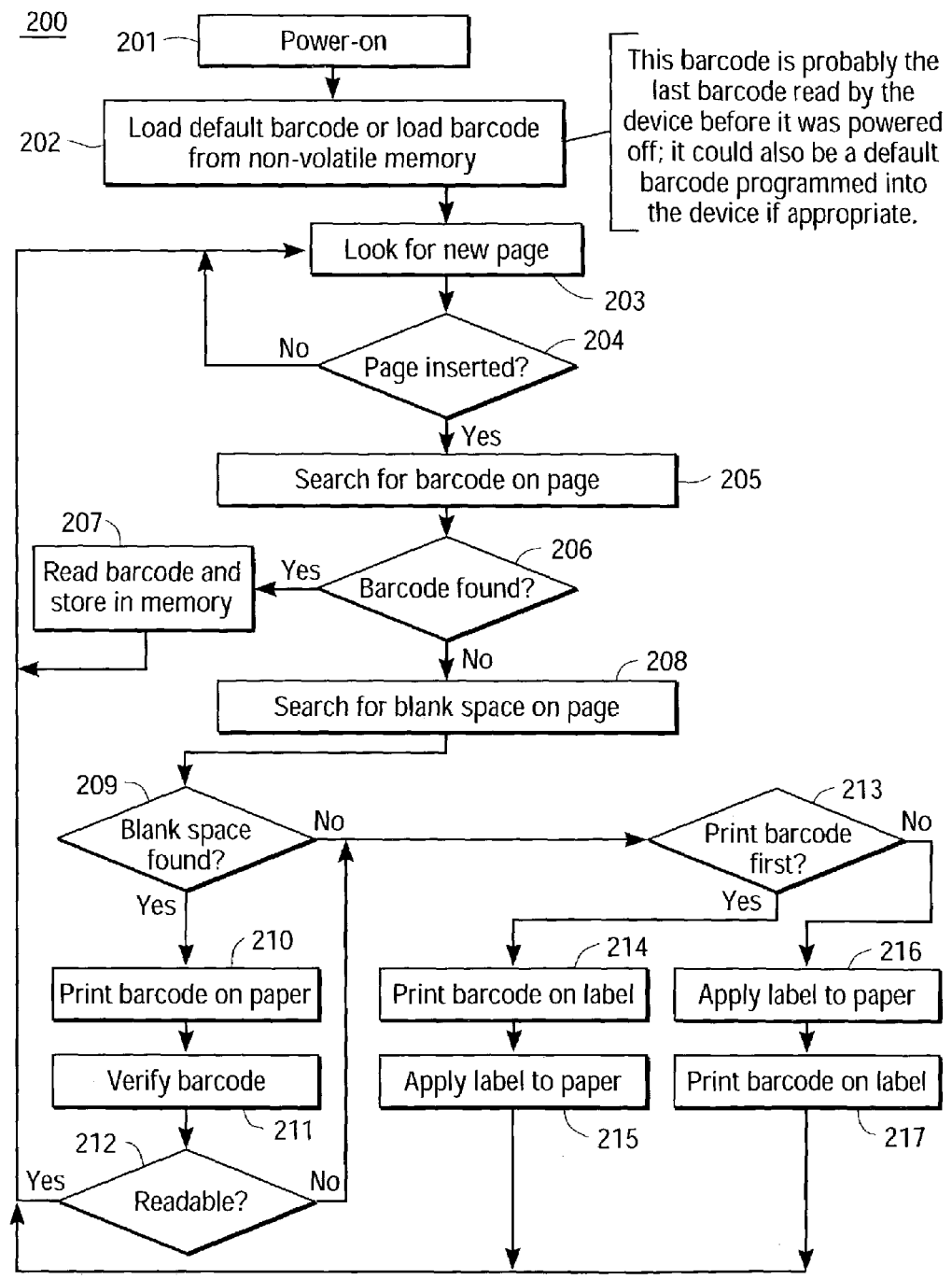
FIG. 2 is a flow diagram of one embodiment of a process of operation for a barcode.

FIG. 2 is a flow diagram of a process performed by one embodiment of the barcode replicator. The process is performed by processing logic which may comprise hardware (circuitry, dedicated logic, etc.), software (such as is run on a general purpose computer system or a dedicated machine), or a combination of both.

The process begins by processing logic powering on the barcode replicator or the power switch 111 (processing block 201). Next, processing logic loads a barcode from non-volatile memory (processing block 202). This barcode may be the last barcode read by the barcode replicator before it was powered off. It could also be a default barcode programmed into the barcode replicator, if appropriate.

After loading the barcode, processing logic looks for a new page (processing block 203). The insertion of a new page can be detected using one of a variety of electronic or mechanical detectors. Some automatic staplers use mechanical switches that detect the edges of a stack of papers being pressed against the switch. The Bostich automatic electric stapler (part number BOS 02011 and sold in many office supply stores in the U.S.) employs an optical switch that detects the insertion of a page by the interruption of the light path between an emitter and detector. Any one of these types of sensors would be adequate for use with the teachings described herein.

Processing logic tests whether a page has been inserted into the barcode replicator (processing block 204). If processing logic does not find that a page has been inserted, then the process returns to processing block 203. If processing logic determines that a page has been inserted, processing logic searches for a barcode on the page (processing block 205).

Alternatively, instead of searching for a new page, the process may be initiated by a switch (e.g., a mechanical switch).

After searching for a barcode on the page, processing logic tests whether a barcode is found (processing block 206). If a barcode is found, processing logic reads the barcode and stores the barcode in memory (processing block 207) and the process returns to processing block 203 where processing continues. If a barcode is not found, the process transitions to processing block 208 where in one embodiment processing logic searches for a blank space on the page. This is an optional operation that may be performed in some embodiments. Processing logic tests whether a blank space is found (processing block 209). If a blank space is found, the process transitions to processing block 210 where processing logic prints the barcode on the paper. Thereafter, processing logic verifies the barcode that has been printed is correct (processing block 211). The processing logic tests whether the barcode is readable (processing block 212). If the barcode is readable, the process transitions to processing block 203 where processing logic looks for a new page.

If processing logic determines that the barcode is not readable or, optionally, if a blank space is not found (processing block 209), processing transitions to processing block 213 where processing logic determines whether it should print the barcode first. If processing logic determines it should print the barcode first, the process transitions to processing block 214 where processing logic prints the barcode on a label and then applies the label to the paper (processing block 215). Once the label has been applied to the paper, the process transitions to processing block 203 where processing logic will look for a new page. If processing logic determines that is should not print the barcode first, the process transitions to processing block 216 where processing logic applies the label to the paper and then prints the barcode on a label (processing block 217). Thereafter, the process transitions to processing block 203 where processing logic looks for a new page. Note that in one embodiment processing logic does not perform processing block 213 and performs either processing block 214 and 215 or processing blocks 216 and 217.

In order to replicate a barcode, the barcode replicator first captures the barcode. For example, in the hospital patient registration process, barcodes are used to attach metadata (e.g., patient ID) to a variety of objects associated with a patient. In one embodiment, a barcode replicator is a handheld device that would allow an individual (e.g., a technician) preparing the patient's files to produce more barcodes from an existing barcode. When an individual positions the replicator over a surface, such as a patient's folder, the bar code replicator searches for a valid barcode. If a valid barcode is found, it is stored in memory and some feedback information (e.g., a sound (e.g., a beep)) from the barcode display (e.g., the patient's name) is displayed in human readable form. In one embodiment, the barcode replicator determines the patient's name by using the information in the barcode to access a database, internal or external to the barcode replicator. Once stored, the barcode can be applied to other flat surfaces. In one embodiment, when the barcode replicator is positioned over another surface, it again searches for a valid barcode; if none is found, the barcode replicator prints the barcode. In one embodiment, the barcode replicator also searches for a blank area of the page to print the barcode. This search is performed by the user moving the bar code replicator around the page.

Thus, various embodiments the barcode replicator described herein may have one or more of a number of features. First, the barcode replicator has disconnected operation in that it is a handheld device for scanning, capturing, and printing barcodes. Also, the barcode replicator is flexible with respect to print media. That is, the barcodes can be printed on any media as well as on stickers. Furthermore, after printing, the barcode replicator tries to read the barcode, and if the barcode is not valid, it then applies a sticker with the barcode on it. Moreover, in one embodiment, the barcode replication has a stapler form factor in that the scanner and print head go above the page, with a rigid surface underneath the page to insure the barcodes are printed evenly. This embodiment may also have unhinged operation so that any level surface can be used as a platen, even those that are not horizontal. Also, the barcode replicator could have a pressure sensor that allows printing to be initiated by applying force to the back of the print head.

Variations and Extensions

The barcode replicator may have many optional features. In one embodiment, instead of beginning by scanning a barcode, a user uses an interface on the barcode replicator to make a barcode stored in memory active and then prints that barcode. This interface may include a display and one or more control buttons to make the selection. The selections may be entered by the user using well-known mechanisms (e.g., menu-driven selections, cursor controls, etc.). For example, the charge nurse might have barcodes for each of the ten patients on the floor. By selecting one barcode from the list, the nurse could apply the barcodes to new charts generated for that patient. This interface could show some information about the barcode (e.g., the patient's name) in human readable form. This display could also be used when the replicator scans a barcode. In this way, a barcode on a file could provide patient confidentiality by not displaying a name, but when scanned the technician could check the replicator display to be sure that the barcode was for Mary Smith before printing it on other materials related to Mary Smith. The display could also provide a mechanism for overwriting which barcode is currently active if scanning a barcode reveals that it is not for the intended patient.

The replicator could repair damaged barcodes by noticing that they are invalid, perhaps because the paper in that area is mangled, and then affixing a sticker over the top. In this way, individuals already manually working with the pages could assure that the barcoding identification system works later when being read by a machine.

The stapler form factor could promote standardization by applying barcodes a consistent distance from the paper's edge, facilitating reading by other devices. The device could operate in unhinged mode using any surface as a platen, similar to using an open stapler to attach something to a bulletin board. The device could use force to initiate barcode application. The device could have a hands-free mode similar to an electric stapler.

The replicator could work without any stickers, or, alternately, could always use stickers.

The barcode replicator does not require any media because it can print directly on a variety of surfaces. If stickers are used, the replicator relies on a validation process to detect whether or not a sticker is needed and should be applied.

In summary, the barcode replicator includes a novel combination of technologies to scan and print barcodes from the same device without relying on any special media. Additionally the printing process includes a validation step that applies a sticker printed with a barcode if necessary.

An Exemplary Computer System

Figure 3:
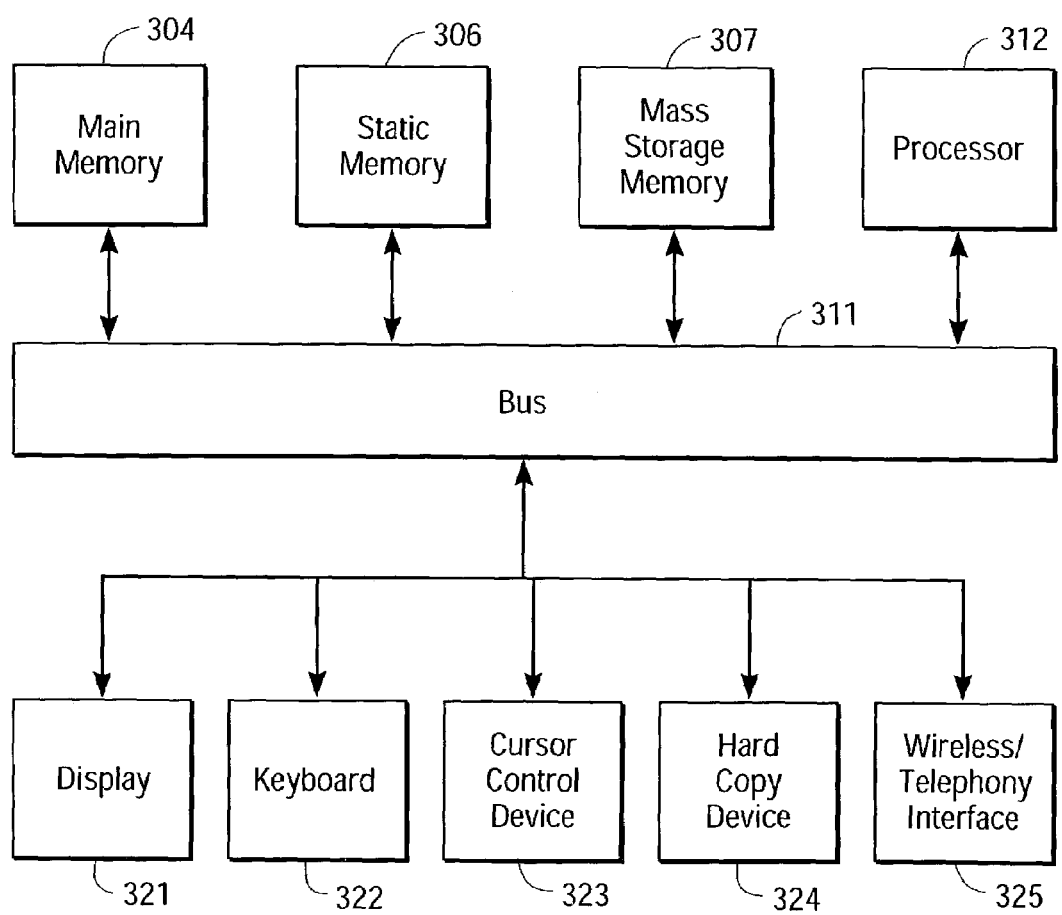
FIG. 3 is a block diagram of one embodiment of a computer system.

FIG. 3 is a block diagram of an exemplary computer system that may perform one or more of the operations described herein. Referring to FIG. 3, computer system 300 may comprise an exemplary client 350 or server 300 computer system. Computer system 300 comprises a communication mechanism or bus 311 for communicating information, and a processor 312 coupled with bus 311 for processing information. Processor 312 includes a microprocessor, but is not limited to a microprocessor, such as, for example, Pentium Pro processor, PowerPC™, etc.

System 300 further comprises a random access memory (RAM), or other dynamic storage device 304 (referred to as main memory) coupled to bus 311 for storing information and instructions to be executed by processor 312. Main memory 304 also may be used for storing temporary variables or other intermediate information during execution of instructions by processor 312.

Computer system 300 also comprises a read only memory (ROM) and/or other static storage device 306 coupled to bus 311 for storing static information and instructions for processor 312, and a data storage device 307, such as a magnetic disk or optical disk and its corresponding disk drive. Data storage device 307 is coupled to bus 311 for storing information and instructions.

Computer system 300 may further be coupled to a display device 321, such as a cathode ray tube (CRT) or liquid crystal display (LCD), coupled to bus 311 for displaying information to a computer user. An alphanumeric input device 322, including alphanumeric and other keys, may also be coupled to bus 311 for communicating information and command selections to processor 312. An additional user input device is cursor control 323, such as a mouse, trackball, trackpad, stylus, or cursor direction keys, coupled to bus 311 for communicating direction information and command selections to processor 312, and for controlling cursor movement on display 321.

Another device that may be coupled to bus 311 is hard copy device 324, which may be used for printing instructions, data, or other information on a medium such as paper, film, or similar types of media. Furthermore, a sound recording and playback device, such as a speaker and/or microphone may optionally be coupled to bus 311 for audio interfacing with computer system 300. Another device that may be coupled to bus 311 is a wired/wireless communication capability 325 to communication to a phone or handheld palm device.

Note that any or all of the components of system 300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
scanning a barcode at a first location with a device, the device being a portable device;
storing the scanned barcode in a memory of the device;
scanning a second location with the device, the second location being different than the first location;
in response to scanning the second location, the device determining whether the second location contains a readable barcode based on a result of scanning of the second location; and
in response to detecting pressure applied to a print head of the device above a threshold, the device printing the scanned barcode of the first location and stored in the memory on the second location if the second location does not contain a readable barcode, wherein if the second location contains an existing barcode that is unreadable, the scanned barcode is printed on the second location overlaying the existing barcode, such that the existing barcode is invisible.

2. The method defined in claim 1 wherein the second location is an intended area of the surface to be printed with a barcode.

3. The method defined in claim 1 further comprising the device validating the barcode printed at the second location by reading back the barcode from the second location substantially immediately following printing the scanned barcode at the second location using the device.

4. The method defined in claim 3 further comprising:
examining the barcode read back from the second location with respect to the scanned barcode obtained from the first location and stored in the memory to determine whether the newly printed barcode is readable; and reapplying the scanned barcode from the memory to the second location if the newly printed barcode is not readable.

5. The method defined in claim 3 further comprising:

the device printing the barcode on a sticker if the device determines that the barcode printed at the second location is unreadable; and the device applying the sticker with the printed barcode at the second location overlaying the determined unreadable barcode previously printed at the second location.

6. The method defined in claim 1 wherein the device is a hand-held device having scanning and printing functionality to perform scanning the barcode from the first location and printing the barcode at the second location respectively.

7. The method defined in claim 1 further comprising displaying information encoded in the barcode on a display in the device.

8. The method defined in claim 7 further comprising displaying additional information associated with the barcode on the display, wherein the additional information includes identification information regarding an object having the surface.

9. The method defined in claim 1 wherein scanning the barcode occurs in response to operation of a switch.

10. The method defined in claim 1 where printing the barcode occurs in response to operation of a switch when a pressure applied to the print head of the device is below the threshold.

11. The method defined in claim 1 further comprising:

determining whether the second location is a blank area if the second location does not contain a readable barcode;

searching with the device for a blank area of the surface as the second location prior to printing the scanned barcode; and printing the scanned barcode in the blank area if the blank area is found on the surface.

12. The method defined in claim 11 further comprising:

printing the scanned barcode on a sticker if the blank area is not found on the surface; and applying the sticker having the printed barcode at the second location of the surface.

13. The method defined in claim 1 further comprising:

determining whether the second location is a blank area if the second location does not contain a readable barcode;

printing the scanned barcode on a sticker if the second location is not a blank area; and applying the sticker having the printed barcode on the second location of the surface overlaying content previously printed at the second location.

14. A portable device comprising:

a barcode reader;

a memory coupled to the barcode reader to store barcodes that are read by the barcode reader;

a printer coupled to the memory to print one or more barcodes stored in the memory; and a controller coupled to the barcode reader, the memory and the printer to cause the barcode reader to read a first barcode at first location, to store the first barcode in the memory, to scan at a second location different than the first location, to determine whether a valid barcode exists at the second location based on a result of scanning of the second location, and to cause the printer to print, in response to a detection of pressure above a certain threshold applied to a print head of the device that is above a threshold, the first barcode on the second location from the memory if no valid barcode exists at the second location, wherein if the second location contains an existing barcode that is invalid, the first barcode is printed on the second location overlaying the existing barcode, such that the existing barcode is invisible.

15. The device defined in claim 14 further comprising a container to house the barcode reader, the memory, the printer, the controller, and a platen, the container having a hinged section to prevent the printer to move laterally across from the platen during printing of a barcode.

16. The device defined in claim 15 wherein the printer comprises the print head that is activated in response to a detection of pressure above a certain threshold applied on back of the print head.

17. The device defined in claim 14 further comprising a sticker dispenser to dispense a sticker to cover an area on which the barcode will be printed.

18. The device defined in claim 14 further comprising communication functionality to generate communications.

19. A machine-readable medium having executable code to cause a machine to perform a method, the method comprising:

scanning a barcode at a first location with a device, the device being a portable device;

storing the scanned barcode in a memory in the device;

scanning a second location with the device, the second location being different than the first location;

in response to scanning the second location, the device determining whether the second location contains a readable barcode based on a result of scanning of the second location; and the device printing the scanned barcode of the first location and stored in the memory directly on the second location if the second location does not contain a readable barcode, wherein if the second location contains an existing barcode that is unreadable, the scanned barcode is printed on the second location overlaying the existing barcode, such that the existing barcode is invisible.

20. An apparatus comprising:

means for scanning a barcode at a first location with a device, the device being a portable device;

means for storing the scanned barcode in a memory in the device;

means for scanning a second location of a surface with the device, the second location being different than the first location;

in response to scanning the second location, means for the device determining whether the second location contains a readable barcode based on a result of scanning of the second location; and means for the device printing the scanned barcode of the first location and stored in the memory directly on the second location if the second location does not contain a readable barcode, wherein if the second location contains an existing barcode that is unreadable, the scanned barcode is printed on the second location overlaying the existing barcode, such that the existing barcode is invisible.

21. A method comprising:

detecting a page has been inserted in a device, the device being a portable device;

in response to the detection of the page inserted into device, the device scanning a location on the page to determine whether the location of the page contains a first barcode;

in response to the detection of pressure applied to a print head of the device above a certain threshold, the device printing a second barcode on the location of the page if the device determines that no barcode is present on the location based on a result of the scanning;

if the location contains the first barcode, the device determining whether the first barcode is readable by scanning the first barcode; and if the first barcode is unreadable, the device printing a third barcode on a first sticker and applying the first sticker with the printed third barcode at the same location of the page overlaying the first barcode, such that the first barcode is invisible.

22. The method defined in claim 21 further comprising:

the device validating whether at least one of the second and third barcodes has been printed correctly by reading back the barcode printed on the location of the page;

the device printing a fourth barcode on a second sticker if the device determines that at least one of the second and third barcodes has been printed incorrectly; and applying the second sticker having the fourth barcode on substantially the same location overlaying the determined incorrect barcode of the page.

23. A method comprising:

scanning a barcode at a surface of a first location with a device, the device being a portable device;

storing the scanned barcode in a memory of the device;

scanning a surface of a second location with the device, the second location being different than the first location;

in response to scanning the surface of the second location, the device determining whether the surface of the second location contains a readable barcode based on a result of scanning of the second location; and the device printing the scanned barcode of the first location and stored in the memory directly on the surface of the second location when the second location does not contain a readable barcode.

24. The method defined in claim 23 further comprises:

scanning the barcode after printing to read back from the surface of the second location with respect to the scanned barcode obtained from the first location and stored in the memory to determine whether the barcode newly printed directly on the surface of the second location is readable; and automatically reapplying the scanned barcode from the memory to the second location if the barcode newly printed directly on the surface of the second location is not readable.

* * * * *